United States Patent
Pauk

(10) Patent No.: US 8,223,907 B2
(45) Date of Patent: Jul. 17, 2012

(54) METHOD FOR DERIVING PARASITIC SIGNALS FROM MODULATED DIGITAL SIGNALS

(75) Inventor: Lukas Pauk, Paskov (CZ)

(73) Assignee: Siemens AG Österreich, Vienna (AT)

( * ) Notice: Subject to any disclaimer, the term of this patent is extended or adjusted under 35 U.S.C. 154(b) by 404 days.

(21) Appl. No.: 12/311,254

(22) PCT Filed: Sep. 28, 2006

(86) PCT No.: PCT/EP2006/066837
§ 371 (c)(1),
(2), (4) Date: Jan. 7, 2010

(87) PCT Pub. No.: WO2008/037297
PCT Pub. Date: Apr. 3, 2008

(65) Prior Publication Data
US 2010/0119021 A1    May 13, 2010

(51) Int. Cl.
*H04B 1/10* (2006.01)

(52) U.S. Cl. ........ 375/350; 375/144; 375/148; 375/229; 375/232; 375/233; 375/316; 375/340; 375/346; 455/63.1; 455/67.13; 455/114.2; 455/296; 455/501; 329/349; 329/353; 370/335; 370/342; 327/551

(58) Field of Classification Search ............... 375/144, 375/148, 229, 232, 233, 316, 340, 346, 350; 455/63.1, 67.13, 114.2, 296, 501; 329/349, 329/353; 370/335, 342; 327/551
See application file for complete search history.

(56) References Cited

U.S. PATENT DOCUMENTS

| 6,473,451 B1 | 10/2002 | Seki et al. |
| 2003/0165205 A1 | 9/2003 | Chu et al. |
| 2004/0235421 A1 | 11/2004 | Matsuoka et al. |

*Primary Examiner* — Leon Flores

(57) ABSTRACT

A method for deriving interference signals from modulated, digital signals is provided. The receiver end reconstructs the modulated digital signals sent by a transmitter. These reconstructed modulated digital signals are then subtracted from the received modulated digital signals, and the result of the subtraction is used to estimate the interference signals without influence by prior filtering at the receiver end. By way of example, it is possible to demodulate the interference signals estimated at the receiver end in order to ascertain possible unauthorized carrier frequencies which disturb the regular carrier frequencies, even if the interference signals are not completely in the bandwidth of the regular carrier frequency or carrier frequencies.

8 Claims, 1 Drawing Sheet

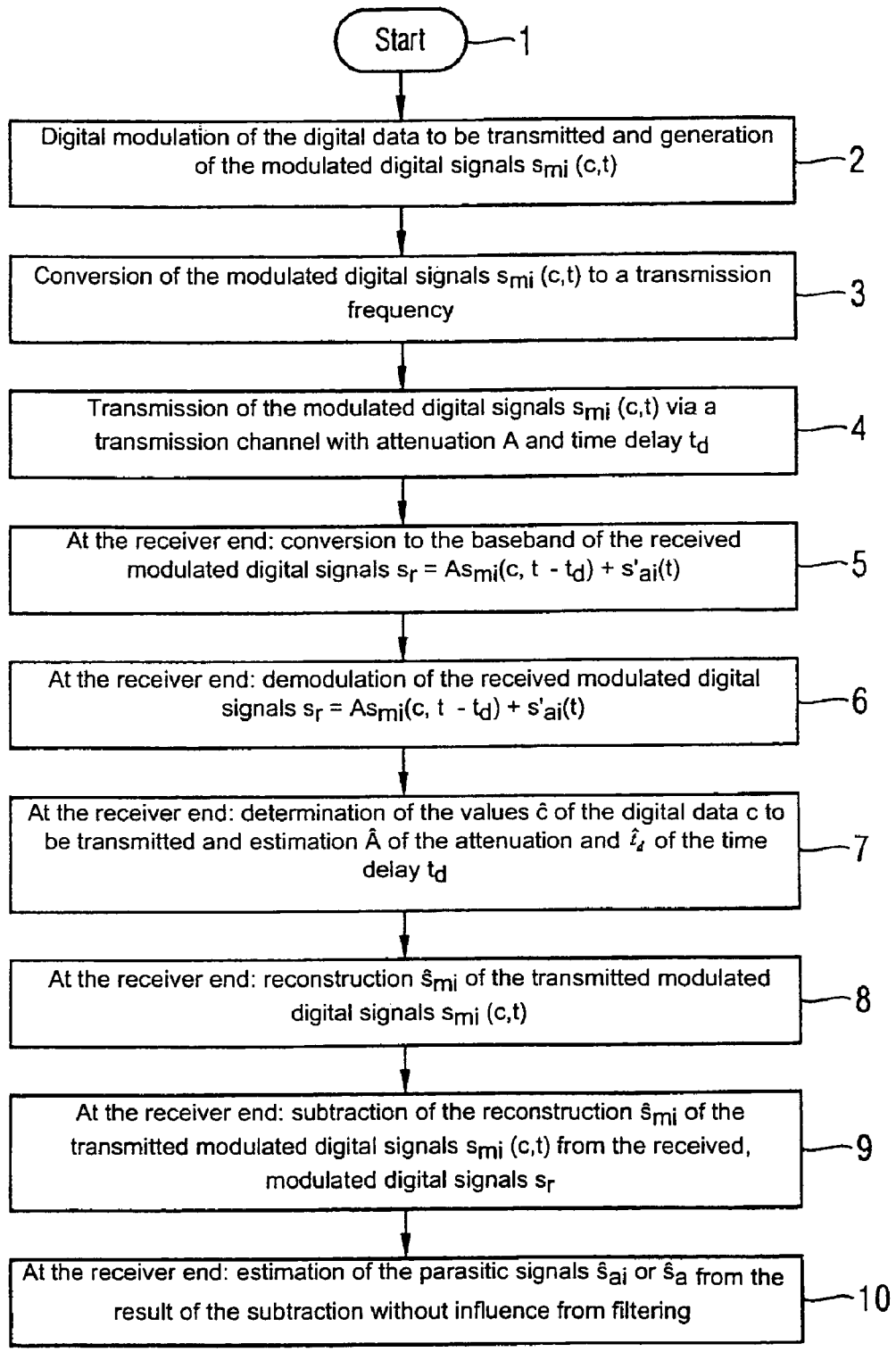

METHOD FOR DERIVING PARASITIC SIGNALS FROM MODULATED DIGITAL SIGNALS

CROSS REFERENCE TO RELATED APPLICATIONS

This application is the US National Stage of International Application No. PCT/EP2006/066837, filed Sep. 28, 2006, which is incorporated by reference herein in its entirety, and claims the benefit thereof.

FIELD OF INVENTION

The invention relates to a method for deriving parasitic signals from modulated digital signals, with each signal being determined by means of a modulation schema from the digital data to be transmitted and with the modulated digital signals received at the receiver end containing parasitic signals in addition to the transmitted, modulated digital signals.

BACKGROUND OF INVENTION

A signal in the technical telecommunications sense is a physical quantity the parameters of which are suitably changed so that the signal can become the carrier of information, with it being possible to distinguish between analog signals and so-called digital signals.

With an analog signal, the information in the signal is contained in the amplitude. If, however, essentially only a finite number of values is assumed for the physical quantity, in the extreme case for example that can be only two values such as "on and off", "0 and 1", etc., the signal is also known as a digital signal. Digital signals that are obtained by "digitization" form an initial basis for these digital signals.

Digitalization enables, for example, information such as text, picture, sound, etc. to be brought to a digital, i.e. accountable, form, which means that generally the information is converted to digital data by a binary code. However, the conversion of an analog physical quantity (e.g. electrical voltage, brightness, pressure, etc.) to discrete numerical values that can be digitally represented is also called digitization.

Digital signals (digital data) that can be transmitted via a transmission channel (e.g. lines, air interfaces, etc.) can be transmitted only over short distances as "square waves" by means of which digital signal sequences such as zeros or ones can be ideally represented or similar ideal pulse shapes forwarded. Over greater distances, the digital signal is distorted by disturbing interference (e.g. attenuation, parasitic signals, etc.) on the transmission channel, which also includes an established point-to-point connection, suitable for the transmission of data over spatial distances or with specific timing, in such a way that the data arrives corrupted at the receiver and cannot be correctly decoded.

In contrast, analog signals can also be transmitted over greater distances depending on the particular frequency. Therefore digital signals are mapped, using digital modulation, on analog signals, that are also known as a carrier frequency or carrier. Sinusoidal oscillations are mainly used as the carrier frequencies.

As part of this process, an instruction, called a modulation schema, by means of which the digital signals or digital data can be modulated on the analog signals or carrier frequencies, is supplied by the digital modulation. Furthermore, a distinction is made between different methods of digital modulation, for example, amplitude modulation (ASK), frequency modulation (FSK), phase modulation (PSK), quadrature phase modulation (QAM), etc.

With amplitude modulation (ASK), the amplitude of a, mostly high-frequency, carrier frequency is changed depending on the (useful) signals, mostly low-frequency, to be transmitted and modulated. With digital amplitude modulation the carrier frequency is, for example, switched on and off on the transmission channel by the digital signals to be transmitted. ASK was used at the beginning of broadcasting technology, because modulated signals of that kind are very easy to generate and demodulate. These advantages are offset by disadvantages such as susceptibility to interference and lesser efficiency, so that altered modulation methods such as quadrature amplitude modulation (QAM) are now used in many applications.

In contrast to ASK, frequency modulation (FSK) and phase modulation (PSK) are less susceptible to interference. With frequency modulation in the simplest case, called binary FSK, the digital zero is coded by an analog oscillation of a frequency and the digital one by an analog oscillation of a second frequency, with the value of each frequency corresponding to a certain discrete value (e.g. zero or one). The frequencies are furthermore symmetrically arranged around a carrier frequency. The distance between the carrier frequency and signal frequency is known as the frequency swing. Technically, the FSK is normally realized, for example, by two oscillators that can be switched on and off in turn, but this means that the changing phase position in the output signal becomes a disadvantage. An example of the use of FSK is in telecommunication for the transmission of data via lines, but it is also used in radio.

With phase modulation (PSK), digital signals, e.g. binary zeros and ones, are coded by analog oscillations of constant amplitude and frequency but with a different phase, so that the phase of the carrier frequencies becomes the carrier of information. The problem with PSK is precise phase-synchronous tuning of the receiver, and this means that this method of modulation is not well suited to types of transmission with large phase errors, such as mobile radio. A development of PSK is quadrature phase shift keying (QPSK). With QPSK, two bits per symbol can be transmitted simultaneously, which doubles the utilization of the available bandwidth. QPSK is used for signal transmission in digital satellite channels, for the terrestrial radiation of digital signals, and also for line transmission methods.

Quadrature amplitude modulation (QAM) combines amplitude modulation (ASK) and phase modulation (PSK), i.e. the carrier frequency is modulated in amplitude and phase. QAM is particularly suitable for the transmission of high data rates and is robust against "phase errors". In addition to PSK, QAM is also one of the linear, digital modulation methods.

Depending on the modulation method or modulation schema (e.g. amplitude modulation (ASK), frequency modulation (FSK), phase modulation (PSK), quadrature phase modulation (QAM), etc.), it is then possible to transmit a specific data rate via a specific transmission channel characterized by the transmission medium used (copper cable, coaxial cable, air, etc.) and a bandwidth. The signals generated by the respective digital modulation, that are derived from digital signals or digital data, can also be designated as modulated digital signals.

During the transmission, these modulated digital signals can be negatively influenced by parasitic signals. Such parasitic signals, by means of which the transmission of (digital)

information or data mapped in a modulated digital signal is impaired, are, for example, noise or interference Noise is several unwanted and persistent interference variables generated by various causes, that are superimposed on the (useful) signal to be transmitted. With radio transmissions, for example, atmospheric, galactic or cosmic noise can occur that is generated by ionization processes and inhomogenities in the atmosphere and by radiation sources in the atmosphere or in space. This noise depends on frequency, weather and the season of the year.

Interference is normally understood to be a superimposition of waves, electromagnetic waves, in telecommunication technology for example, relative to the distribution of the frequencies or wavelengths in the signals. A distinction can be made between constructive interference, with which the superimposed waves mutually amplify, and destructive interference with which the superimposed waves mutually fade or even extinguish completely. Therefore, interference can cause disturbances in the transmission of (useful) signals, such as modulated digital signals, and the quality of the transmitted, digital data can be substantially impaired.

Particularly with radio technology, interference, that can also include noise, is a widespread problem if this interference, for example, also occurs within a frequency band of the carrier frequency or carrier frequencies, with the range of the electromagnetic spectrum used for technical communication being regarded as the frequency band to which an electromagnetic wave (e.g. carrier frequency) is assigned according to its frequency and wavelength. The difference between two frequencies from which a specific continuous cohesive frequency range, i.e., a frequency band is formed is in this case known as a bandwidth. Interference in satellite communication can occur, for example, due to neighboring satellite transmissions, locally received terrestrial signals or an unauthorized transmission. In many cases, the carrier frequencies of these other transmissions (e.g. neighboring satellite transmissions, etc.) generate parasitic signals, e.g. interference, in a frequency band that is assigned to a different carrier frequency and this therefore disturbs the transmission of modulated digital signals in this frequency band. Carrier frequencies that are used for the transmission of signals in a frequency band assigned to them are also known as regular carrier frequencies with respect to this frequency band. Carrier frequencies from which, for example, parasitic signals in frequency bands not assigned to them are triggered, can also be regarded as non-authorized or unauthorized carrier frequencies with regard to these frequency bands. Parasitic signals, such as interference, can also however occur between carrier frequencies of a frequency band, for example with PSK.

Because due to parasitic signals, for example interference, the quality of transmission of modulated digital signals can be seriously impaired, it is important to be able to filter out the parasitic signals from the received signals at the receiver end on the one hand, but on the other hand to also be able to identify the parasitic signals in order to be able to subsequently suppress them It is known that to assess the quality of a type of modulation or of a demodulator and also at the same time to filter out interference at the receiver end, the error vector magnitude (EVM), called an error vector, can be used. The error vector is calculated by subtracting a reference signal from an input signal measured at the receiver end, usually by mean of a demodulator.

The reference signal in this case is obtained at the receiver end from the demodulated digital data, with the demodulated digital data passing through a filter which, normally, simulates the transmission path, i.e. the reference signal is therefore the output of a filter that, for example, is a combination of a filter that is used at a transmitter end during the demodulation, and a demodulation filter that corresponds to the filter used for demodulation of the modulated digital signal at the receiver end. The measured input signal that is also obtained from the reference signal is also assessed in the demodulator by a measuring filter. This measuring filter, for example, also corresponds to the demodulation filter. This means that when calculating the error vector the respective signal is filtered both for determining the reference signal and when measuring the input signal.

Matched or signal-matched filters that have a (matched) transmission function so that an additive disturbed (useful) signal can be detected as reliably as possible are normally used as demodulation filters at the receiver end. A signal-matched filter is mainly concentrated on the bandwidth of the regular carrier frequency, or regular carrier frequencies, and active only in the area of the signal rate. Bandpass filters, for example, by means of which parasitic signals outside the frequency band of the modulated, digital signals are suppressed, are frequently used as demodulation filters.

Because a filter, in which, for example, the transmission function of the demodulation filter is incorporated, filters both the reference signal and the measured input signal before the calculation of the error vector, the error vector is also influenced by this filtering. Furthermore, it has been shown to be disadvantageous that parasitic signals whose bandwidths are not completely within the frequency band of the regular carrier frequency or carrier frequencies are also influenced by the filtering and therefore can only be determined to a limited degree, if at all, with the help of the error vector calculation. Thus, for example, significant parts of a spectrum of the parasitic signal can be cut off by the filtering, with e.g. a demodulation or identification of the parasitic signal or, for example, an estimation of the mid frequency, bandwidth and power of the parasitic signal, thus being made impossible.

A further problem with the error vector calculation is that the error vector can only be used with linear digital modulation methods such as PSK, Q-PSK, and QAM, etc. for the derivation of parasitic signals.

Document US 2003/0165205 A1 describes a method and a device for measuring and demodulating interference contained in a digital carrier. With the method described, the interference is determined with the aid of an error vector that is generated by a blind equalizer demodulator. With the method described in document US 2003/0165205 A1, the received signals, on the basis of which the error vector is calculated and the interference thus determined, also pass through a filter in the receiver. Furthermore, digital signals generated from the received signals are again filtered in order to limit these to the bandwidth of the signals in the basic band. Thus, the method described in document US 2003/0165205 has disadvantages similar to an estimation of parasitic signals using an error vector calculation. The filtering causes significant parts of the spectrum of a parasitic signal, for example, to be cut off, which means that only those parasitic signals can be identified that are located within the frequency band of the regular carrier frequency or regular carried frequencies.

SUMMARY OF INVENTION

The object of the invention is therefore to provide a method that enables all parasitic signals that influence a transmission of modulated digital signals to be derived, including those that do not lie fully within the frequency band of one or more regular carrier frequencies of the modulated digital signals and that can be used not only for linear, digital modulation methods.

The object of this invention is achieved by a method of the type mentioned in the introduction, with the transmitted, modulated digital signals being reconstructed at a receiver end, these reconstructed modulated digital signals then being subtracted from the received, modulated digital signals and the parasitic signals being then estimated from the results of the subtraction but without influence due to the prior filtering at the receiver end.

The main aspect of the proposed solution according to the invention is that the parasitic signals, especially those parasitic signals the bandwidths of which do not lie fully within the frequency band of the regular carrier frequency or carrier frequencies, can be estimated without being influenced by filtering, e.g. by a signal-matched filter such as the demodulation filter, because at the receiver end neither the received modulated digital signals nor signals from the reconstruction of the transmitted modulated digital signals pass through a filter in which, for example, the transmission function of the demodulation filter is incorporated. Therefore it is possible in an advantageous manner to identify the sources of the parasitic signals at the receiver end on the basis of the estimated parasitic signals or to estimate the mid frequency, bandwidth and power of a parasitic signal.

In addition, the method according to the invention can be advantageously used for the derivation of parasitic signals not only with linear digital modulation, such as PSK, Q-PSK, QAM, etc., but instead generally for digital modulation.

To achieve the objective, it is provided that at the receiver end the transmitted, modulated digital signals are reconstructed on the basis of the values, determined at the receiver end, of the digital signals to be transmitted, because in this way a modulation of the digital signals at a transmitter end, i.e. a conversion of the digital data into modulated digital signals at the transmitter end, can be replicated at the receiver end and thus, from the reconstruction of the transmitted modulated digital signals a good estimation of the modulated digital signals sent by the transmitter can be obtained.

It is advantageous if at the receiver end during a reconstruction of the transmitted, modulated digital signals, influencing parameters of a transmission channel such as fading of the transmission channel and/or a time delay through the transmission channel can be taken into account because the received, modulated digital signals can also be influenced by parameters of the transmission channel, such as attenuation, time delay, etc.

With a preferred development of the invention, the transmitted, modulated digital signals $s_m$ are shown as a time-related function and/or as a linear combination of N modulated digital signals $s_{mi}$ with an index $i=1, 2, \ldots, N$ with the digital data to be transmitted as parameters, because this approach takes into account that the modulated digital signals $s_m$ or each of the modulated, digital signals $s_{mi}$ correspond(s) to the relevant digital data and the modulation schema used.

The received signals $s_r$, in particular, can be shown as $s_r = As_m Cm\, t-t_d) + s_{ai}(t)$, with A designating the attenuation of the transmission channel, c the digital data to be transmitted, $t_d$ the time delay of the transmission channel and $s_{ai}(t)$, the parasitic signals, and with, at the receiver end, the reconstruction of the transmitted modulated digital signal $\hat{s}_{mi}$ being shown as $\hat{s}_{mi} = \hat{A} s_{mi}(\hat{c}, t-\hat{t}_d)$, with $\hat{A}$ designating the estimation of the attenuation, $\hat{c}$ the values, determined at the receiver end, of the digital data to be transmitted and $\hat{t}_d$ the estimation of the time delay. In both representations therefore, the corresponding digital data and the influencing parameters of the transmission channel, such as attenuation and time delay, are advantageously taken into account. Furthermore, the representation of the received, modulated digital signals $s_r$, also takes account of the parasitic signals.

For this purpose, it can furthermore be advantageous if an estimation of the parasitic signals $\hat{s}_a$ is determined according to the formula $$\hat{s}_a = s_a + \sum_{i=1}^{N} \underbrace{A_i s_{mi}(c_i, t-t_{di}) - \hat{A}_i s_{mi}(\hat{c}_i, t-\hat{t}_{di})}_{s_0(t)}$$

with $s_a$ designating the parasitic signals, the minuend of the subtraction a proportion of the received modulated digital signals $s_r$, the subtrahend of the subtraction the reconstructed, modulated digital signals $\hat{s}_{mi}$ and with $s_0(t)$ approaching zero with an increasing quality of estimation. This representation of the estimation of the parasitic signals provides an equation from which, in a simple manner—iteratively if need be, the parasitic signals, or at least a very good estimation of the parasitic signals, can be derived on the basis of which the parasitic signals can then be demodulated and/or identified.

BRIEF DESCRIPTION OF THE DRAWINGS

The inventive method is explained in more detail in the following using an example and with reference to the accompanying figures.

FIGURE shows an example of the sequence of the method for deriving parasitic signals from modulated digital signals.

DETAILED DESCRIPTION OF INVENTION

The method begins with an initial step 1. In a second method step 2, a modulated digital signal $s_m$ is generated by digital modulation (e.g. PSK, Q-PSK, QAM, etc.) from digital data to be transmitted, by using a modulation schema. In doing so, for example, the modulated digital signal $s_m$ can be represented as a linear combination of N signals $s_{m1}$, $s_{m2}, \ldots, s_{mN}$ with a specific modulated signal $s_{mi}$ being determined by an index $i=1, 2, \ldots, N$. Each of the modulated digital signals $s_{mi}$ in this case corresponds to specific data c, with it being possible for the modulated digital signals $s_{mi}$, for example, to be also represented as functions $s_{mi}(c, t)$ with the parameters c and t for a time characteristic and it being assumed that the signals $s_{mi}(c, t)$ are, for example, interference-free or ideal.

In a third method step 3, the modulated digital signals $s_{mi}(c, t)$ are converted to a transmission frequency before transmission, i.e. the signals $s_{mi}(c, t)$ are converted from a carrier frequency that normally lies in the baseband, i.e. in the frequency range of their original position, to a different carrier frequency (e.g. in the case of radio technology to the radio frequency).

In a fourth method step 4, the modulated digital signals $s_{mi}(c, t)$ are then transmitted via a transmission channel (e.g. lines, air interface, etc.) to a receiver. During this, the signals $s_{mi}(c, t)$ are influenced depending upon the transmission medium used (e.g. copper cable, coaxial cable, air, etc.). A time delay $t_d$ or attenuation A, which is understood to be an unwanted energy loss of a signal during a transmission from a transmitter to a receiver, can occur through the transmission channel. Furthermore, disturbances such as noise, interference, etc. of the signals $s_{mi}(c, t)$ can occur during the transmission of the modulated digital signals $s_{mi}(c, t)$.

In a fifth method step 5, a received, modulated digital signal $s_r$ is, at a receiver end, converted downwards from the transmission frequency, to the baseband of the carrier frequency for example. The received, modulated digital signal $S_r$ in this case also includes, in addition to the transmitted, modulated digital signal $s_{mi}(c, t)$ with the index i, with this signal $s_{mi}$ having been influenced for example by attenuation A and a time delay $t_d$ of the transmission channel, parasitic signals $s'_{ai}(t)$. At the receiver end, the received, modulated digital signal $s_r$ k can, for example, be represented by the formula $s_r = As_{mi}(c, t-t_d) + s'_{ai}(t)$.

In a sixth method step 6, the received modulated, digital signal $s_r$ is demodulated. During this process, estimations $\hat{c}$ for the digital data c, $\hat{A}$ for the attenuation A of the transmission channel and $\hat{t}_d$ for the time delay $t_d$ through the transmission channel are determined in a seventh method step 7 by a demodulator block from the i-th transmitted modulated, digital signal $s_{mi}$ that is contained in a time-delayed and attenuated form in the signal $s_r$.

In an eighth method step 8, a reconstruction $\hat{S}_{mi}$ of the transmitted, modulated digital signal $s_{mi}$ is derived from these estimations $\hat{c}$, $\hat{A}$ and $\hat{t}_d$. The reconstruction $\hat{S}_{mi}$ can, for example, be described by the formula $\hat{S}_{mi} = \hat{A}s_{mi}(\hat{c}, t-\hat{t}_d)$. In a ninth method step 9 the reconstruction $\hat{S}_{mi}$ of the transmitted, modulated digital signal $s_{mi}$ is then subtracted from the received, modulated digital signal $s_r$ converted to the baseband.

By means of this subtraction, an estimation $\hat{S}_{ai}$ of the parasitic signals with the index i is determined in a tenth method step 10 according to a formula:

$$\hat{s}_{ai} = \underbrace{As_{mi}(c, t-t_d) - \hat{A}s_{mi}(\hat{c}, t-\hat{t}_d)}_{s_0(t)} + s'_{ai}$$

No filter transmission function is incorporated in this formula because at the receiver end neither the received modulated, digital signal $s_r$ nor the reconstruction $\hat{S}_{mi}$ of the transmitted modulated, digital signal $s_{mi}$ passes through a filter in which, e.g. the transmission function of a demodulation filter or "matched filter" is incorporated. The value of the difference $s_0(t)$ furthermore approaches zero with increasing estimation accuracy.

This procedure of the method steps 5 to 10 can be repeated for all modulated, digital signals $s_{mi}$ accordingly and in doing so the corresponding reconstruction $\hat{S}_{mi}$ can be found. The demodulator block in this case must be set so that the respective modulated, digital signal $s_{mi}$ is always demodulated, in order that the associated estimations $\hat{c}$, $\hat{A}$ and $\hat{t}_d$ are found. It must be pointed out that e.g. the constants c, A and $t_d$ and the estimations thereof can differ for each signal $s_{mi}$ with a different index i. Therefore, the constants c, A and $t_d$ and the estimations thereof should differ with respect to the index i.

After the reconstruction of all N signals $s_{mi}$, these can then also be subtracted from the received, modulated digital signals $s_r$. From this difference, an estimation $\hat{S}_a$ of the parasitic signals can be determined, e.g. according to the general formula:

$$\hat{s}_a = s_a + \sum_{i=1}^{N} \underbrace{A_i s_{mi}(c_i, t-t_{di}) - \hat{A}_i s_{mi}(\hat{c}_i, t-\hat{t}_{di})}_{s_0(t)}$$

with zero being approached with increasing estimation quality $s_0(t)$. This formula for the estimation $\hat{S}_a$ of the parasitic signals also incorporates no filter transmission function of a demodulation filter because neither the received, modulated digital signal $s_r$ nor the reconstruction $\hat{S}_{mi}$ of the transmitted modulated digital signal $s_{mi}$ passes through a filter in which e.g. the transmission function of a demodulation filter or a "matched filter" is incorporated. The estimation $\hat{S}_a$ of the parasitic signals is therefore likewise not influenced by filtering and therefore suitable, for example for identifying interference from unauthorized carrier frequencies.

The invention claimed is:

1. A method for deriving parasitic signals from modulated digital signals, with each signal being determined from digital data to be transmitted by using a modulation schema, comprising:
   receiving, at a receiver end, modulated digital signals transmitted by a transmitting end, the received signals including parasitic signals and the transmitted modulated signals;
   reconstructing the transmitted modulated digital signals at a receiver end;
   subtracting the reconstructed modulated digital signals from the received modulated digital signals;
   estimating the parasitic signals from a result of the subtraction without influence from prior filtering at the receiver end; and
   identifying sources of the parasitic signals at the receiver end based on the estimated parasitic signals,
   wherein mid frequency, bandwidth and/or power is determined from the estimated parasitic signals.

2. The method as claimed in claim 1, wherein at the receiver end, values of the digital data to be transmitted determined are used in the reconstructing.

3. The method as claimed in claim 1, wherein at the receiver end, influencing parameters of a transmission channel are used in the reconstructing.

4. The method as claimed in claim 3, wherein the influencing parameters include an attenuation of the transmission channel and/or a time delay through the transmission channel.

5. The method as claimed in claim 1, wherein the transmitted modulated digital signals are shown as a time-related function and/or as a linear combination of N modulated digital signals with an index i=1, 2, ..., N with the digital data to be transmitted as parameters.

6. The method as claimed in claim 1, wherein a received signal is represented as $s_r = As_{mi}(c, t-t_d) + s'_{ai}(t)$, wherein A is an attenuation of a transmission channel,
$s_{mi}$ is a transmitted modulated digital signal with an index i, by which values of 1 to N are assumed,
c is the digital data to be transmitted,
$t_d$ is a time delay of the transmission channel, and
$s'_{ai}(t)$ is a parasitic signal, by which the i-th transmitted modulated digital signal $s_{mi}$ is influenced.

7. The method as claimed in claim 1, wherein at the receiver end, the reconstruction of the transmitted modulated digital signals is represented as $\hat{S}_{mi} = \hat{A}s_{mi}(\hat{c}, t-\hat{t}_d)$, wherein $\hat{A}$ is an estimation of an attenuation of a transmission channel,
$s_{mi}$ is a transmitted modulated digital signal with an index i, by which values from 1 to N are assumed,
$\hat{c}$ is an estimation of the digital data to be transmitted, determined at the receiver end, and
$\hat{t}_d$ is an estimation of a time delay.

8. The method as claimed in claim 1, wherein an estimation of the parasitic signals is determined according to the formula $$\hat{s}_a = s_a + \sum_{i=1}^{N} \underbrace{A_i s_{mi}(c_i, t - t_{di}) - \hat{A}_i s_{mi}(\hat{c}_i, t - \hat{t}_{di})}_{s_0(t)}, \quad \text{wherein}$$

A is an attenuation of a transmission channel
$\hat{A}$ is an estimation of the attenuation,
$s_{mi}$ is a transmitted modulated digital signal with an index i, by which values from 1 to N are assumed,
c is the digital data to be transmitted,
$\hat{c}$ is an estimation of the digital data to be transmitted, determined at the receiver end, and
$t_d$ is a time delay of the transmission channel,
$\hat{t}_d$ is an estimation of the time delay,
$s_a$ are the parasitic signals,
the minuend of the subtraction designating a proportion of the received modulated digital signals, and
the subtrahend of the subtraction designating
the reconstructed modulated digital signals $\hat{s}_{mi}$ and with $s_0(t)$ approaching zero with increasing estimation quality.

* * * * *